Patented Aug. 13, 1940

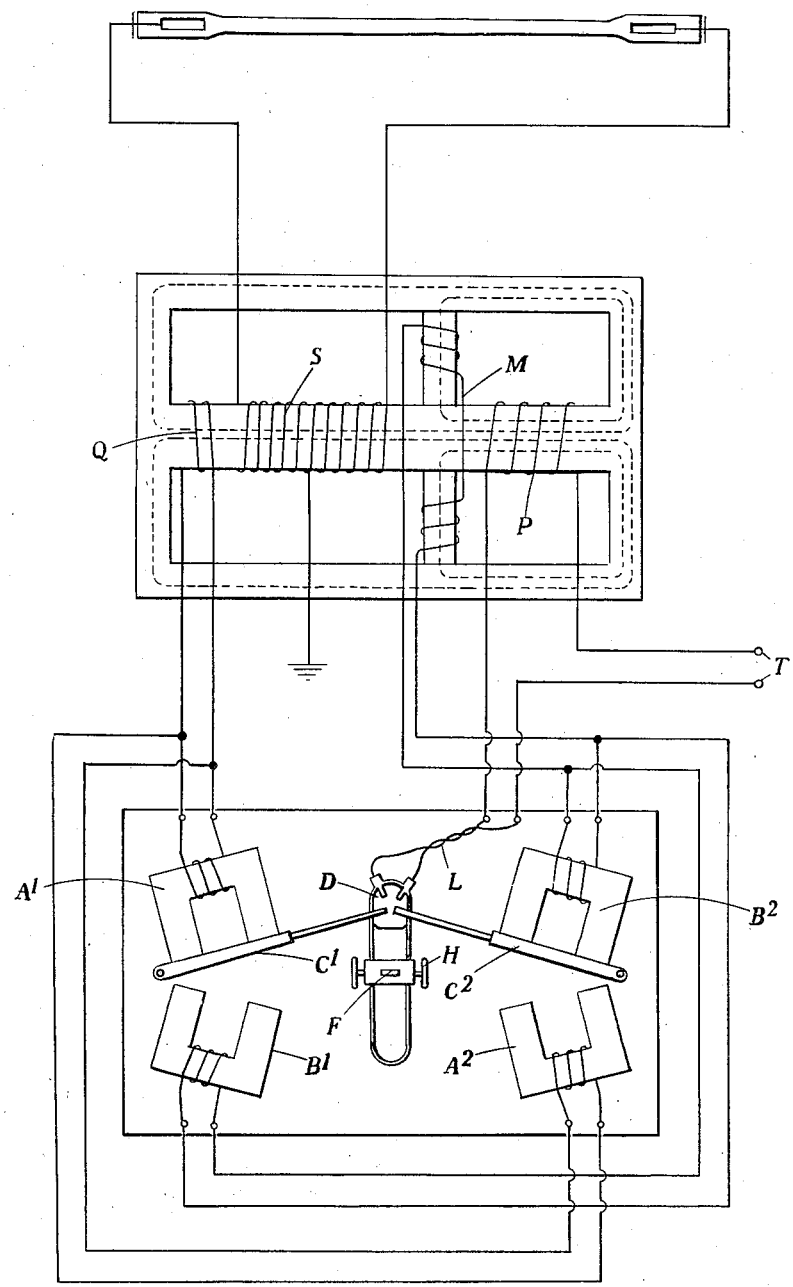

2,210,888

UNITED STATES PATENT OFFICE 2,210,888

APPARATUS FOR THE ELECTRICAL PROTECTION OF GASEOUS AND OTHER DISCHARGE TUBES

Harold Everard Monteagle Barlow, London, England

Application May 18, 1938, Serial No. 208,712
In Great Britain June 10, 1937

3 Claims. (Cl. 176—124)

This invention relates to a protective device for the electrical protection of gaseous and other electric discharge tubes as used, for example, for electric signs, and electric lighting, and of electric valve, cathode ray, X-ray and other ray appliances, the current to which is supplied through a static transformer.

In accordance with the usual standard specification the transformers employed for supplying current to discharge-tubes must be capable of withstanding continuously a short-circuit on the secondary side when the rated primary voltage and frequency are maintained at the primary terminals. To satisfy this requirement such transformers are usually constructed so as to have a large leakage reactance, the core being designed to provide a path through which leakage magnetic flux readily passes.

A short circuit on the secondary winding causes comparatively little change in the magnitude of either primary or secondary currents. Apart from an initial transient disturbance there is only a minor alteration in the value of the flux linking the primary winding, whilst the flux linking the secondary winding falls to a relatively small value by reason of the increased flux leakage. These effects are accompanied by alterations of the phase and wave-form of the flux in the different parts of the magnetic circuit.

The object of the present invention is to provide a protective device which will automatically interrupt the current input to the primary winding of the static transformer when any change occurs in the normal distribution of the flux of such a transformer.

Broadly the invention consists of an electrical protective device for electric discharge tubes, wherein the current input to the primary winding of a static transformer supplying the discharge tube is interrupted by the action of an electro-magnetic relay which is operated automatically as a result of any change from the normal distribution of the flux of the transformer.

In the preferred arrangement the current input is interrupted by the action of a normally energised electro-magnetic relay which operates automatically by a change in energisation brought about as a result of any change from the noraml distribution of the flux of the transformer.

In practice it is preferred to have two electro-magnetic relays, one operating when an open circuit occurs on the secondary circuit and the other when an overload occurs on the secondary circuit. These relays may either be separate from the transformer or embodied in the core of the same and arranged so that their armatures serve to operate a mercury or other switch or fuse controlling the current input to the transformer.

A convenient arrangement is to employ two electro-magnetic relays one of which operates on overload and the other on open-circuit to actuate the same mercury or other switch or fuse by means of currents derived from additional windings on the transformer core or from part of the existing secondary winding and from one additional winding. The overload relay gives protection against either a short-circuit or an earth fault and the open-circuit relay reduces the arc formation when the secondary circuit is interrupted while the transformer is in use.

In order that the invention may be clearly understood and carried into effect an embodiment having a pair of differential relays will now be described, by way of example, by aid of the accompanying diagrammatic drawing.

In the example illustrated, in which a single-phase transformer is used, it is necessary to provide two additional windings Q and M. The winding Q must be placed on the core so that the E. M. F. induced in it is produced by substantially the same flux as links the ordinary secondary winding S. When the centre point of the secondary winding S is earthed the additional winding Q should preferably be placed at the extreme end of the core remote from the primary P in order that an earth fault on either side of the secondary should be equally effective in reducing the flux linkages with Q.

The additional winding M must be placed so that the E. M. F. induced in it is produced by leakage flux and since there are normally two separate leakage paths, two coils M connected in series to assist one another would usually be employed.

Each of the two relays for use with these additional windings has two distinct laminated iron electromagnets A and B supplied with currents from Q and M respectively. The laminated iron armatures $C_1$ and $C_2$ are quite independent. Each is hinged at one end and free to move into contact with the poles of either one or other of their associated electromagnets. Under ordinary operating conditions the armature $C_1$ is held in contact with the poles of electromagnet $A_1$ and the armature $C_2$ in contact with the poles of electromagnet $B_2$, the armatures remaining thus when the alternating current supply to the terminals T is disconnected.

If an overload occurs on the secondary of the transformer the currents in the windings of electromagnets $A_1$ and $A_2$ fall rapidly whereas the currents in the windings of electromagnets $B_1$ and $B_2$ rise. The armature $C_1$ is therefore pulled over into contact with the poles of $B_1$ and in so doing opens the small mercury switch D by rocking it about the spindle H when the arm $C^1$ strikes the projection F. At the same time the armature $C_2$ is held with an increased force against the poles of the electromagnet $B_2$ and therefore remains at rest.

If an open-circuit occurs on the secondary of the transformer the currents in the windings of electromagnets $B_1$ and $B_2$ fall to a small value whereas the currents in the windings of electromagnets $A_1$ and $A_2$ rise. In this case therefore the armature $C_2$ is pulled over into contact with the poles of $A_2$ while the armature $C_1$ remains at rest and the mercury switch D is again opened by the arm $G_2$ striking the projection F.

Since the mercury switch is connected by means of flexible leads L in series with the primary of the transformer the supply is automatically interrupted under both the overload and the open-circuit conditions.

The armatures $C_1$ and $C_2$ remain in the "off" positions until pushed back again by hand into the ordinary working positions.

The differences of phase and wave-form between the currents derived from the additional transformer windings Q and M makes the operation of the relays more effective for a particular arrangement of the connections to the electromagnets A and B. Thus a relative phase change of 180° is effected by the reversal of one pair of leads.

There is a tendency for the armatures $C_1$ and $C_2$ to chatter, and noise arising from this source may be reduced by providing a cushion between them and the poles of the electro-magnets or by immersion of the armatures in oil.

The effect of an earth on the secondary of the transformer is the same as the effect of a short-circuit since one point on the secondary winding must, according to the relevant standard specification, be connected to earth. A short-circuit on half of the secondary winding is found to be just as effective in causing a redistribution of the flux in the iron core as is a short-circuit on the whole of the secondary winding.

What I claim is:

1. In an electrical protective device for electric discharge tubes in combination, a static transformer supplying the discharge tube, means for interrupting the current input to the primary winding of the transformer, two independently operating armatures operatively associated with said current interrupting means and electro-magnets associated with said armatures to form a pair of electro-magnetic relays said electro-magnets being electrically associated with the transformer in such manner that an electro-magnet of one relay is normally energised by an E. M. F. produced by substantially the same flux as links the ordinary secondary winding of the transformer and an electro-magnet of the other relay is normally energised by an E. M. F. produced by leakage flux in the transformer.

2. In an electrical protective device for electric discharge tubes, in combination, a static transformer supplying the discharge tube, a normally closed mercury switch in the primary circuit of the transformer, two independently operating armatures associated with said mercury switch, one of said armatures operating to cause the switch to move to interrupt the current input to the primary of the transformer when a change from the normal distribution of the flux of the transformer is produced by an open circuit on the secondary circuit and the other armature when said change in the normal distribution of the flux is produced by an earth or overload on the secondary circuit.

3. In an electrical protective device for electric discharge tubes in combination, a static transformer supplying the discharge tube, a normally closed mercury switch in the primary circuit of the transformer, two independently operating armatures operatively associated with said mercury switch, a pair of electro-magnets associated with each armature to provide a pair of differential relays, two additional windings on the transformer core, one of said windings being disposed in proximity to the secondary winding of the transformer so as to have an E. M. F. induced in it by the flux which normally links the said secondary winding, the other winding being disposed so as to have induced in it an E. M. F. produced by leakage flux in the transformer, said relays being so associated with the additional windings that upon any change from the normal distribution of the flux of the transformer an increased energisation occurs simultaneously in two of said electro-magnets, one electro-magnet being in one relay and the other electro-magnet being in the other relay and so that in one relay the increased energisation serves to move its armature and during such movement to engage the mercury switch and thereby operate the same to interrupt the current input to the primary of the transformer and in the other relay the simultaneous increase in energisation serves to hold its armature against movement, the particular relay operating being determined according to whether the change in the normal distribution of the flux of the transformer is the result of an open circuit on the secondary circuit or an overload on the secondary circuit.

HAROLD EVERARD
MONTEAGLE BARLOW.